(12) United States Patent
Lu et al.

(10) Patent No.: US 11,703,578 B2
(45) Date of Patent: Jul. 18, 2023

(54) ULTRASONIC SENSOR ARRAY CONTROL TO FACILITATE SCREEN PROTECTORS

(71) Applicant: QUALCOMM Incorporated, San Diego, CA (US)

(72) Inventors: Yipeng Lu, Davis, CA (US); Hrishikesh Vijaykumar Panchawagh, Cupertino, CA (US); Jessica Liu Strohmann, Cupertino, CA (US); Kostadin Dimitrov Djordjev, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/663,357

(22) Filed: May 13, 2022

(65) Prior Publication Data

US 2022/0268906 A1     Aug. 25, 2022

Related U.S. Application Data

(63) Continuation of application No. 16/414,164, filed on May 16, 2019, now Pat. No. 11,346,927.

(51) Int. Cl.
    *G01S 7/52*          (2006.01)
    *G06F 3/041*        (2006.01)
                  (Continued)

(52) U.S. Cl.
    CPC .......... *G01S 7/5205* (2013.01); *G06F 3/0418* (2013.01); *G06V 40/1306* (2022.01); *G06F 3/044* (2013.01)

(58) Field of Classification Search
    CPC ...... G06F 3/0418; G06F 3/044; G01S 7/5205; G06V 40/1306
                  (Continued)

(56) References Cited

U.S. PATENT DOCUMENTS

| | | | | |
|---|---|---|---|---|
| 7,489,303 B1 * | 2/2009 | Pryor | ................... | G01C 21/265 345/184 |
| 9,013,451 B1 * | 4/2015 | Schneider | ............. | G06F 3/0488 345/173 |

(Continued)

FOREIGN PATENT DOCUMENTS

CA           3036513 A1 *   4/2018              G06F 21/32

OTHER PUBLICATIONS

International Preliminary Report on Patentability—PCT/US2020/032761 The International Bureau of WIPO—Geneva, Switzerland, dated Nov. 25, 2021.

(Continued)

*Primary Examiner* — Kwin Xie

(74) *Attorney, Agent, or Firm* — QUALCOMM Incorporated

(57) ABSTRACT

Techniques for operating an ultrasonic sensor array, the ultrasonic sensor array disposed under a platen, include making a determination whether or not to recalibrate the ultrasonic sensor array based on whether a first screen protector disposed above the platen has been removed or replaced by a second screen protector; and recalibrating the ultrasonic sensor array, when the determination is to recalibrate the ultrasonic sensor array. In some cases, the techniques include prompting a user to indicate whether or not the screen protector has been changed or removed, and recalibrating the ultrasonic sensor array only after confirmation from the user.

20 Claims, 10 Drawing Sheets

(51) Int. Cl.
*G06V 40/13* (2022.01)
*G06F 3/044* (2006.01)

(58) Field of Classification Search
USPC .................................. 345/173–174; 367/13
See application file for complete search history.

(56) References Cited

U.S. PATENT DOCUMENTS

| | | |
|---|---|---|
| 2008/0211779 A1* | 9/2008 | Pryor .................... G06F 3/0488 |
| | | 345/173 |
| 2015/0198699 A1* | 7/2015 | Kuo ........................ G01S 15/02 |
| | | 367/7 |
| 2016/0266717 A1* | 9/2016 | Oral .................... G06F 3/04186 |
| 2017/0004347 A1* | 1/2017 | Agassy .............. G06V 40/1365 |
| 2017/0131840 A1* | 5/2017 | Deichmann ............. G06F 3/044 |
| 2017/0231534 A1 | 8/2017 | Agassy et al. |
| 2017/0249048 A1* | 8/2017 | Hill ....................... G06F 1/1626 |
| 2018/0101711 A1* | 4/2018 | D'Souza ............ G06V 40/1306 |
| 2018/0213333 A1* | 7/2018 | Kitchens, II ....... G06V 40/1306 |
| 2018/0253587 A1 | 9/2018 | Lowe |
| 2019/0050620 A1* | 2/2019 | Andersson ......... G06V 40/1306 |
| 2019/0188441 A1* | 6/2019 | Hall ..................... G06T 7/0002 |
| 2019/0205591 A1* | 7/2019 | Ban .......................... G01L 1/16 |
| 2020/0074134 A1 | 3/2020 | Lim et al. |
| 2020/0363516 A1 | 11/2020 | Lu et al. |

OTHER PUBLICATIONS

International Search Report and Written Opinion—PCT/US2020/032761—ISA/EPO—dated Aug. 24, 2020.

\* cited by examiner

ULTRASONIC SENSOR ARRAY CONTROL TO FACILITATE SCREEN PROTECTORS

PRIORITY CLAIM

This application claims priority to, and is a continuation of, U.S. patent application Ser. No. 16/414,164, filed on May 16, 2019 and entitled "ULTRASONIC SENSOR ARRAY CONTROL TO FACILITATE SCREEN PROTECTORS," which is hereby incorporated by reference and for all purposes.

TECHNICAL FIELD

This disclosure relates to ultrasonic transducer arrays and, more particularly to techniques for detecting the presence of a screen protector disposed over an ultrasonic transducer array.

DESCRIPTION OF THE RELATED TECHNOLOGY

Ultrasonic sensor systems may use a transmitter to generate and send an ultrasonic wave through a transmissive medium and towards an object to be detected and/or imaged. The ultrasonic transmitter may be operatively coupled with an ultrasonic sensor array configured to detect portions of the ultrasonic wave that are reflected from the object. At each material interface encountered by the ultrasonic pulse, a portion of the ultrasonic pulse may be reflected. In some implementations, an ultrasonic pulse may be produced by starting and stopping the transmitter during a short interval of time (e.g. less than 1 microsecond). An ultrasonic sensor system may include biometric sensors, such as fingerprint or handprint sensors, and/or other ultrasonic imaging applications.

Piezoelectric ultrasonic transducers are attractive candidates for such applications and may include piezoelectric micromechanical ultrasonic transducers (PMUTs) configured as a multilayer stack that includes a piezoelectric layer stack. The piezoelectric layer stack may include a layer of piezoelectric material such as, for example, a layer of polyvinylidene fluoride (PVDF) or a PVDF copolymer. The piezoelectric layer may convert vibrations caused by ultrasonic reflections into electrical output signals. In some implementations, the ultrasonic sensor system further includes a thin-film transistor (TFT) layer that may include an array of sensor pixel circuits that may, for example, amplify electrical output signals generated by the piezoelectric layer.

In some applications, a two-dimensional array of a large number of PMUT elements (a "PMUT array") may be integrated with and disposed behind or "under" a platen (a "cover plate" or "cover glass") configured as a display screen with which the user interacts. The display screen, for example, may provide a user touch interface and/or be incorporated in a personal electronic device such as a mobile phone or tablet. Such display screens may benefit from a removable and/or disposable "screen protector", usually a transparent protective sheet of material, such as glass or plastic that protects the underlying display screen.

SUMMARY

The systems, methods and devices of this disclosure each have several innovative aspects, no single one of which is solely responsible for the desirable attributes disclosed herein.

One innovative aspect of the subject matter described in this disclosure relates to a method for operating an ultrasonic sensor array, the ultrasonic sensor array disposed under a platen. The method includes determining whether to recalibrate the ultrasonic sensor array based on whether a first screen protector disposed above the platen has been removed or replaced by a second screen protector, and recalibrating the ultrasonic sensor array, when the determination is to recalibrate the ultrasonic sensor array.

In some examples, the determination may be made by performing a background estimation process. In some examples, the background estimation process may include obtaining characteristics of an air image and comparing the obtained characteristics with characteristics of a baseline air image. In some examples, the baseline air image may include an air image obtained by the ultrasonic sensor array operating without any screen protector.

In some examples, the method may further include prompting a user to indicate whether the first screen protector has been removed or replaced, and recalibrating the ultrasonic sensor array may be performed only after confirmation from the user.

In some examples, the method may further include mitigating effects of removal or replacement of the first screen protector by adjusting at least one sensor tuning offset. In some examples, the at least one sensor tuning offset may include one or more of range gate delay, frequency offset, time delay offset and phase correction offset.

In some examples, the determination may be made based on any one or more of: phase of received ultrasonic waves, platen temperature gradients, change of signal-to-noise ratio (SNR) or image quality (IQ) vs range gate delay characteristics, change of SNR or IQ characteristics as a function of background calibration, or change in touchscreen capacitance.

In some examples, the method may further include operating the ultrasonic sensor array with a modified sensor drive scheme, the modification configured to provide one or both of an increased duration transmit tone burst and a quasi-continuous wave transmit signal.

In some examples, the method may further include operating the ultrasonic sensor array and processing image data using a point spread function (PSF) image reconstruction technique.

In some examples, at least one of the first screen protector or the second screen protector may include a multilayer stack having a thickness of approximately $0.75\lambda$ or 1.25, where $\lambda$ is a characteristic wavelength of an ultrasonic transmission produced by the ultrasonic sensor array.

According to some implementations, an apparatus includes a controller and an ultrasonic sensor array, the ultrasonic sensor array disposed under a platen. The controller is configured to: make a determination whether to recalibrate the ultrasonic sensor array based on whether a first screen protector disposed above the platen has been removed or replaced by a second screen protector; and recalibrate the ultrasonic sensor array, when the determination is to recalibrate the ultrasonic sensor array.

In some examples, the controller is configured to make the determination by way of a background estimation process. In some examples, the background estimation process may include obtaining characteristics of an air image and comparing the obtained characteristics with characteristics of a baseline air image. In some examples, the baseline air image may relate to an air image obtained by the ultrasonic sensor array when operated without any screen protector.

In some examples, the controller may be further configured to prompt a user to indicate whether the first screen protector has been removed or replaced, and the controller may be configured to recalibrate the ultrasonic sensor array only after confirmation from the user.

In some examples, the controller may be further configured to mitigate effects of removal or replacement of the first screen protector by way of an adjustment of at least one sensor tuning offset. In some examples, the at least one sensor tuning offset may include one or more of range gate delay, frequency offset, time delay offset and phase correction offset.

In some examples, at least one of the first screen protector or the second screen protector may include a multilayer stack having a thickness of approximately $0.75\lambda$ or $1.25\lambda$, where $\lambda$ is a characteristic wavelength of an ultrasonic transmission produced by the ultrasonic sensor array.

According to some implementations, for a non-transitory computer readable medium storing program code to be executed by a controller of an ultrasonic sensor array, the ultrasonic sensor array disposed under a platen, the program code includes instructions configured to cause the controller to: make a determination whether to recalibrate the ultrasonic sensor array based on whether a first screen protector disposed above the platen has been removed or replaced by a second screen protector; and recalibrate the ultrasonic sensor array, when the determination is to recalibrate the ultrasonic sensor array.

In some examples, the determination may be made by performing a background estimation process. In some examples, the background estimation process may include obtaining characteristics of an air image and comparing the obtained characteristics with characteristics of a baseline air image. In some examples, the baseline air image may relate to an air image obtained by the ultrasonic sensor array operating without any screen protector.

In some examples, the program code may further include instructions configured to cause the controller to prompt a user to indicate whether the first screen protector has been removed or replaced, and to cause the controller to recalibrate the ultrasonic sensor array only after confirmation from the user.

In some examples, the program code may further include instructions configured to cause the controller to mitigate effects of removal or replacement of the first screen protector by adjusting at least one sensor tuning offset. In some examples, the at least one sensor tuning offset may include one or more of adjusting range gate delay, frequency offset, time delay offset and phase correction offset.

In some examples, the determination may be made by assessing one more of: phase of received ultrasonic waves, platen temperature gradients, change of signal-to-noise ratio (SNR) or image quality (IQ) vs range gate delay characteristics, change of SNR or IQ characteristics as a function of background calibration, and change in touchscreen capacitance.

In some examples, the program code may further include instructions configured to cause the controller to operate the ultrasonic sensor array with a modified sensor drive scheme, the modification configured to provide one or both of an increase duration transmit tone burst and a quasi-continuous wave transmit signal.

In some examples, the program code may further include instructions configured to cause the controller to operate the ultrasonic sensor array and to process image data using a point spread function (PSF) image reconstruction technique.

In some examples, at least one of the first screen protector or the second screen protector may include a multilayer stack having a thickness of approximately $0.75\lambda$ or $1.25\lambda$, where $\lambda$ is a characteristic wavelength of an ultrasonic transmission produced by the ultrasonic sensor array.

According to some implementations, an apparatus includes an ultrasonic sensor array disposed under a platen, first means for making a determination whether to recalibrate the ultrasonic sensor array based on whether a screen protector disposed above the platen has undergone a change and second means for recalibrating the ultrasonic sensor array, when the determination is to recalibrate the ultrasonic sensor array.

In some examples, the determination is made by performing a background estimation process. In some examples, the background estimation process may include obtaining characteristics of an air image and comparing the obtained characteristics with characteristics of a baseline air image. In some examples, the baseline air image may relate to an air image obtained by the ultrasonic sensor array when operated without any screen protector.

In some examples, the determination may be made by assessing one more of: phase of received ultrasonic waves, platen temperature gradients, change of signal-to-noise ratio (SNR) or image quality (IQ) vs range gate delay characteristics, change of SNR or IQ characteristics as a function of background calibration, and change in touchscreen capacitance.

In some examples, at least one of the first screen protector or the second screen protector may include a multilayer stack having a thickness of approximately $0.75\lambda$ or $1.25\lambda$, where $\lambda$ is a characteristic wavelength of an ultrasonic transmission produced by the ultrasonic sensor array.90

BRIEF DESCRIPTION OF THE DRAWINGS

Details of one or more implementations of the subject matter described in this specification are set forth in this disclosure and the accompanying drawings. Other features, aspects, and advantages will become apparent from a review of the disclosure. Note that the relative dimensions of the drawings and other diagrams of this disclosure may not be drawn to scale. The sizes, thicknesses, arrangements, materials, etc., shown and described in this disclosure are made only by way of example and should not be construed as limiting. Like reference numbers and designations in the various drawings indicate like elements.

DETAILED DESCRIPTION

Figure 1:
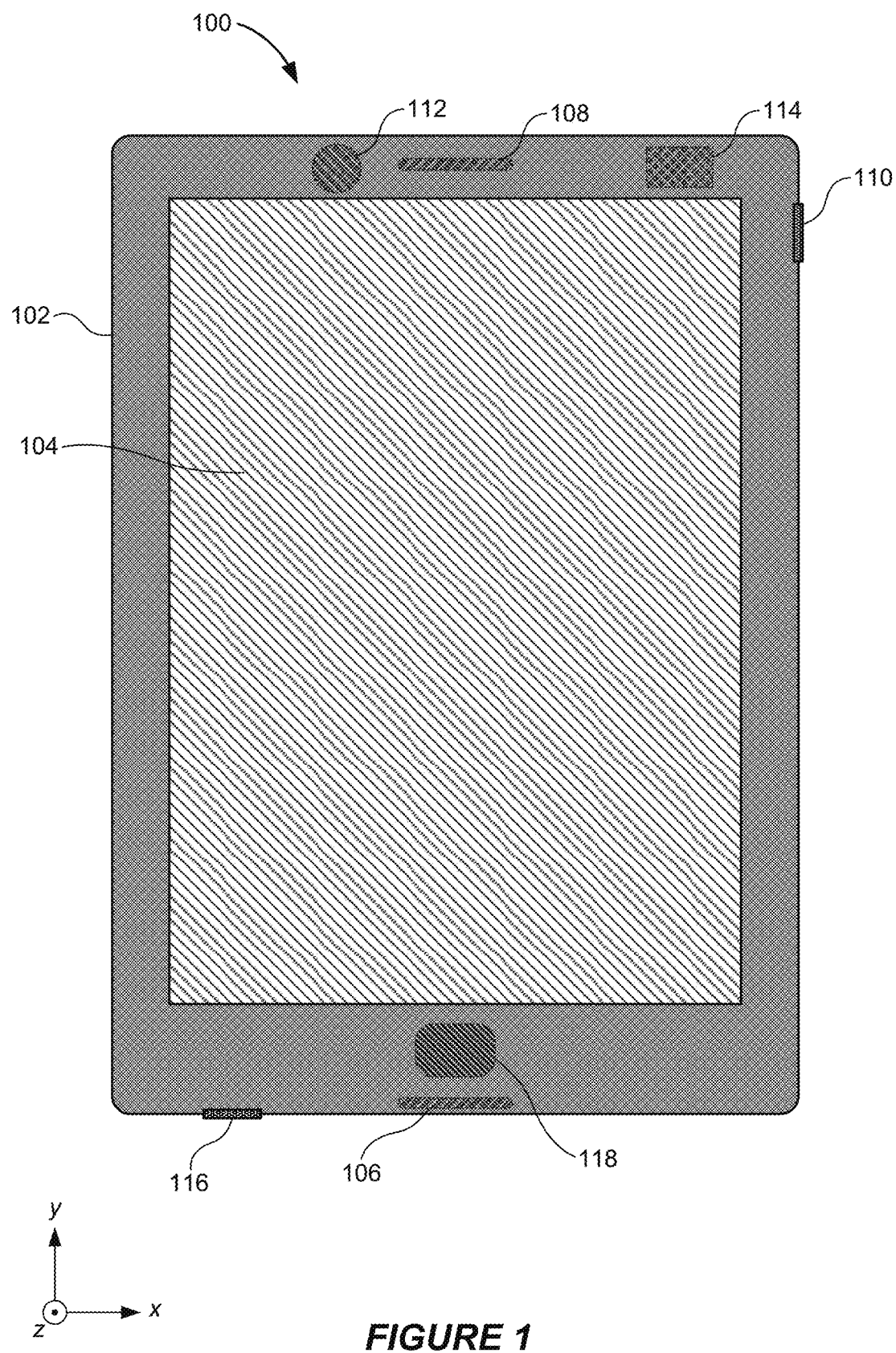
FIG. 1 shows a front view of a diagrammatic representation of an example of an electronic device that includes an ultrasonic sensing system according to some implementations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a sensor system. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands and patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, steering wheels, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, automated teller machines (ATMs), parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

In some implementations, ultrasonic sensor systems include piezoelectric material for the transmission and receiving of ultrasonic waves.

For example, a voltage applied across piezoelectric material corresponding to a transmitter may result in the piezoelectric material stretching or contracting, e.g., being deformed such that the material is strained in response to the applied voltage, resulting in the generation of the ultrasonic wave, as previously discussed. The reflected signals (e.g., the reflected portions of the ultrasonic wave, as previously discussed) may result in the stretching or contracting of piezoelectric material corresponding to a receiver. This results in the generation of a surface charge, and therefore, a voltage across the piezoelectric material that may be used as an electrical output signal representing a portion of raw image data that represents fingerprint image data.

Some implementations of the subject matter described in this disclosure may be practiced to realize one or more of the following potential advantages. The disclosed techniques involve detecting the installation, removal or replacement of the screen protector and/or recalibrating an ultrasonic sensor array (sensing system) taking into account the installation, removal or replacement.

FIG. 1 shows a front view of a diagrammatic representation of an example of an electronic device 100 that includes an ultrasonic sensing system according to some implementations. The electronic device 100 may be representative of, for example, various portable computing devices such as cellular phones, smartphones, multimedia devices, personal gaming devices, tablet computers and laptop computers, among other types of portable computing devices. However, various implementations described herein are not limited in application to portable computing devices. Indeed, various techniques and principles disclosed herein may be applied in traditionally non-portable devices and systems, such as in computer monitors, television displays, kiosks, vehicle navigation devices and audio systems, among other applications.

In the illustrated implementation, the electronic device 100 includes a housing (or "case") 102 within which various circuits, sensors and other electrical components may be disposed. In the illustrated implementation, the electronic device 100 also includes a display (that may be referred to herein as a "touchscreen display" or a "touch-sensitive display") 104. The display 104 may generally be representative of any of a variety of suitable display types that employ any of a variety of suitable display technologies. For example, the display 104 may be a digital micro-shutter (DMS)-based display, a light-emitting diode (LED) display, an organic LED (OLED) display, a liquid crystal display (LCD), an LCD display that uses LEDs as backlights, a plasma display, an interferometric modulator (IMOD)-based display, or another type of display suitable for use in conjunction with touch-sensitive user interface (UI) systems.

The electronic device 100 may include various other devices or components for interacting with, or otherwise communicating information to or receiving information from, a user. For example, the electronic device 100 may include one or more microphones 106, one or more speakers 108, and in some cases one or more at least partially mechanical buttons 110. The electronic device 100 may include various other components enabling additional features such as, for example, one or more video or still-image cameras 112, one or more wireless network interfaces 114 (for example, Bluetooth, WiFi or cellular) and one or more non-wireless interfaces 116 (for example, a universal serial bus (USB) interface or an HDMI interface).

The electronic device 100 may include an ultrasonic sensing system 118 capable of imaging an object signature, such as a fingerprint, palm print or handprint. In some implementations, the ultrasonic sensing system 118 may function as a touch-sensitive control button. In some implementations, a touch-sensitive control button may be implemented with a mechanical or electrical pressure-sensitive system that is positioned under or otherwise integrated with the ultrasonic sensing system 118. In other words, in some implementations, a region occupied by the ultrasonic sensing system 118 may function both as a user input button to control the electronic device 100 as well as a sensor to enable security features such as user authentication based on, for example, a fingerprint, palm print or handprint.

Figure 2A:
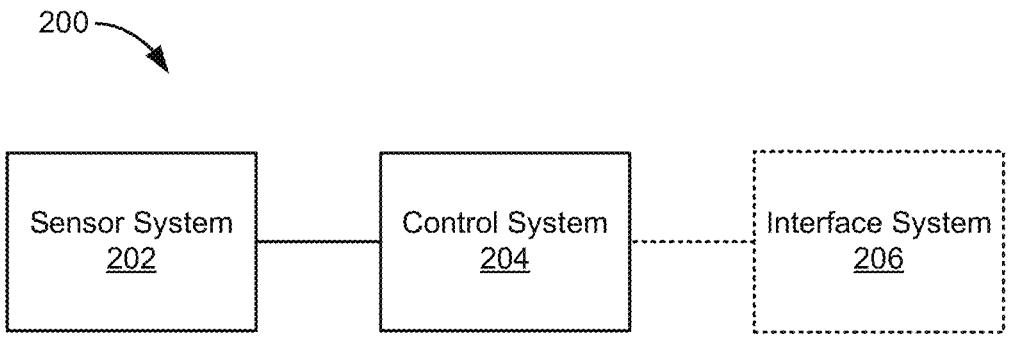
FIG. 2A shows a block diagram representation of components of an example of an ultrasonic sensing system, according to some implementations.

FIG. 2A shows a block diagram representation of components of an example of an ultrasonic sensing system, according to some implementations. In the illustrated implementation, an ultrasonic sensing system 200 includes a sensor system 202 and a control system 204 electrically coupled with the sensor system 202. The sensor system 202 may be capable of scanning a target object and providing raw measured image data usable to obtain an object signature of, for example, a human appendage, such as one or more fingers or toes, a palm, hand or foot. The control system 204 may be capable of controlling the sensor system 202 and processing the raw measured image data received from the sensor system 202. In some implementations, the ultrasonic sensing system 200 may include an interface system 206 capable of transmitting or receiving data, such as raw or processed measured image data, to or from various components within or integrated with the ultrasonic sensing system 200 or, in some implementations, to or from various components, devices or other systems external to the ultrasonic sensing system 200.

Figure 2B:
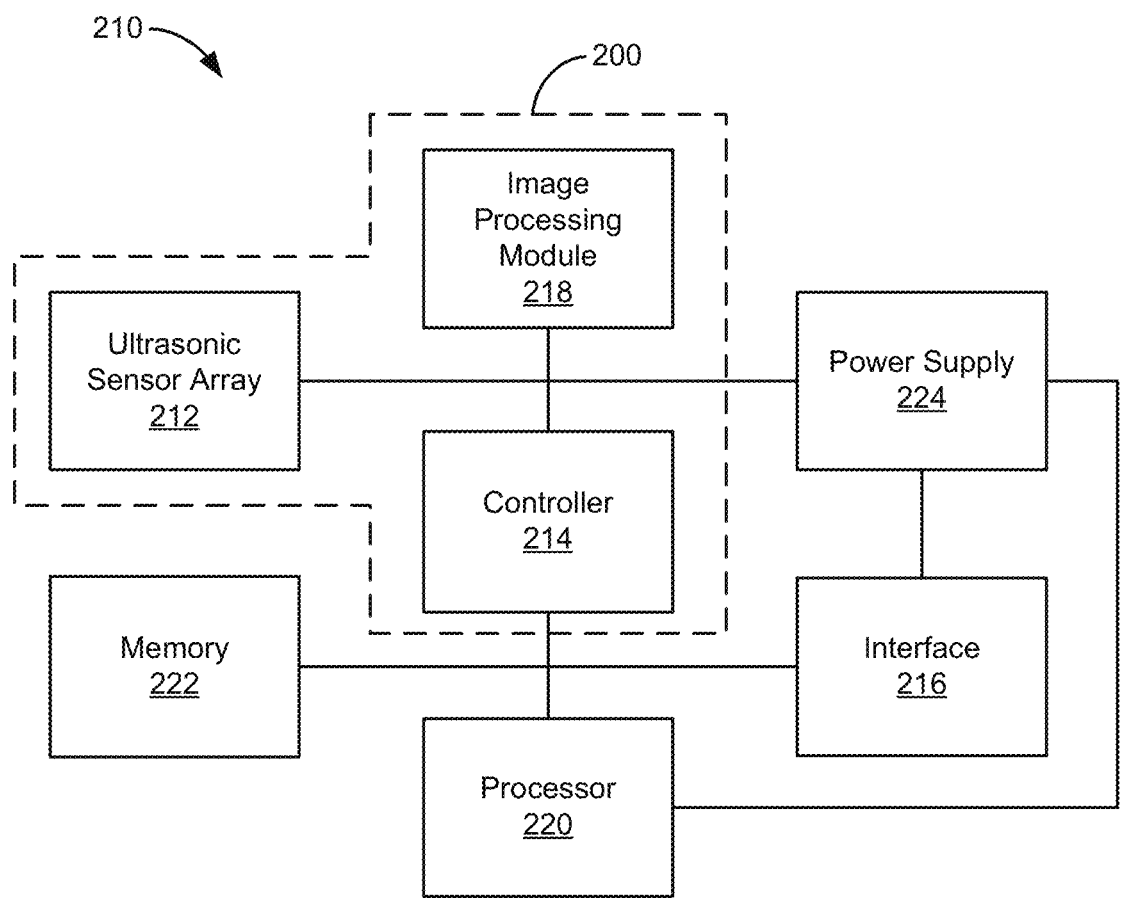
FIG. 2B shows a block diagram representation of components of an example of an electronic device, according to some implementations.

FIG. 2B shows a block diagram representation of components of an example of an electronic device, according to some implementations. In the illustrated example, an electronic device 210 includes the ultrasonic sensing system 200 of FIG. 2A. For example, the electronic device 210 may be a block diagram representation of the electronic device 100 shown in and described with reference to FIG. 1 above. The sensor system 202 of the ultrasonic sensing system 200 of the electronic device 210 may be implemented with an ultrasonic sensor array 212. The control system 204 of the ultrasonic sensing system 200 may be implemented with a controller 214 that is electrically coupled with the ultrasonic sensor array 212. While the controller 214 is shown and described as a single component, in some implementations, the controller 214 may collectively refer to two or more distinct control units or processing units in electrical communication with one another. In some implementations, the controller 214 may include one or more of a general purpose single- or multi-chip processor, a central processing unit (CPU), a digital signal processor (DSP), an applications processor, an application specific integrated circuit (ASIC), a field programmable gate array (FPGA) or other programmable logic device (PLD), discrete gate or transistor logic, discrete hardware components, or any combination thereof designed to perform the functions and operations described herein.

The ultrasonic sensing system 200 of FIG. 2B may include an image processing module 218. In some implementations, raw measured image data provided by the ultrasonic sensor array 212 may be sent, transmitted, communicated or otherwise provided to the image processing module 218. The image processing module 218 may include any suitable combination of hardware, firmware and software configured, adapted or otherwise operable to process the image data provided by the ultrasonic sensor array 212. In some implementations, the image processing module 218 may include signal or image processing circuits or circuit components including, for example, amplifiers (such as instrumentation amplifiers or buffer amplifiers), analog or digital mixers or multipliers, switches, analog-to-digital converters (ADCs), passive or active analog filters, among others. In some implementations, one or more of such circuits or circuit components may be integrated within the controller 214, for example, where the controller 214 is implemented as a system-on-chip (SoC) or system-in-package (SIP). In some implementations, one or more of such circuits or circuit components may be integrated within a DSP included within or coupled with the controller 214. In some implementations, the image processing module 218 may be implemented at least partially via software. For example, one or more functions of, or operations performed by, one or more of the circuits or circuit components just described may instead be performed by one or more software modules executing, for example, in a processing unit of the controller 214 (such as in a general purpose processor or a DSP).

In some implementations, in addition to the ultrasonic sensing system 200, the electronic device 210 may include a separate processor 220, a memory 222, an interface 216 and a power supply 224. In some implementations, the controller 214 of the ultrasonic sensing system 200 may control the ultrasonic sensor array 212 and the image processing module 218, and the processor 220 of the electronic device 210 may control other components of the electronic device 210. In some implementations, the processor 220 communicates data to the controller 214 including, for example, instructions or commands. In some such implementations, the controller 214 may communicate data to the processor 220 including, for example, raw or processed image data. It should also be understood that, in some other implementations, the functionality of the controller 214 may be implemented entirely, or at least partially, by the processor 220. In some such implementations, a separate controller 214 for the ultrasonic sensing system 200 may not be required because the functions of the controller 214 may be performed by the processor 220 of the electronic device 210.

Depending on the implementation, one or both of the controller 214 and processor 220 may store data in the memory 222. For example, the data stored in the memory 222 may include raw measured image data, filtered or otherwise processed image data, estimated PSF or estimated image data, and final refined PSF or final refined image data. The memory 222 may store processor-executable code or other executable computer-readable instructions capable of execution by one or both of the controller 214 and the processor 220 to perform various operations (or to cause other components such as the ultrasonic sensor array 212, the image processing module 218, or other modules to perform operations), including any of the calculations, computations, estimations or other determinations described herein (including those presented in any of the equations below). It should also be understood that the memory 222 may collectively refer to one or more memory devices (or "components"). For example, depending on the implementation, the controller 214 may have access to and store data in a different memory device than the processor 220. In some implementations, one or more of the memory components may be implemented as a NOR- or NAND-based Flash memory array. In some other implementations, one or more of the memory components may be implemented as a different type of non-volatile memory. Additionally, in some implementations, one or more of the memory components may include a volatile memory array such as, for example, a type of RAM.

In some implementations, the controller 214 or the processor 220 may communicate data stored in the memory 222 or data received directly from the image processing module 218 through an interface 216. For example, such communicated data can include image data or data derived or otherwise determined from image data. The interface 216 may collectively refer to one or more interfaces of one or more various types. In some implementations, the interface 216 may include a memory interface for receiving data from or storing data to an external memory such as a removable memory device. Additionally or alternatively, the interface 216 may include one or more wireless network interfaces or one or more wired network interfaces enabling the transfer of raw or processed data to, as well as the reception of data from, an external computing device, system or server.

A power supply 224 may provide power to some or all of the components in the electronic device 210. The power supply 224 may include one or more of a variety of energy storage devices. For example, the power supply 224 may include a rechargeable battery, such as a nickel-cadmium battery or a lithium-ion battery. Additionally or alternatively, the power supply 224 may include one or more supercapacitors. In some implementations, the power supply 224 may be chargeable (or "rechargeable") using power accessed from, for example, a wall socket (or "outlet") or a photovoltaic device (or "solar cell" or "solar cell array") integrated with the electronic device 210. Additionally or alternatively, the power supply 224 may be wirelessly chargeable.

As used hereinafter, the term "processing unit" refers to any combination of one or more of a controller of an ultrasonic system (for example, the controller 214), an image processing module (for example, the image processing module 218), or a separate processor of a device that includes the ultrasonic system (for example, the processor 220). In other words, operations that are described below as being performed by or using a processing unit may be performed by one or more of a controller of the ultrasonic system, an image processing module, or a separate processor of a device that includes the ultrasonic sensing system.

Figure 3A:
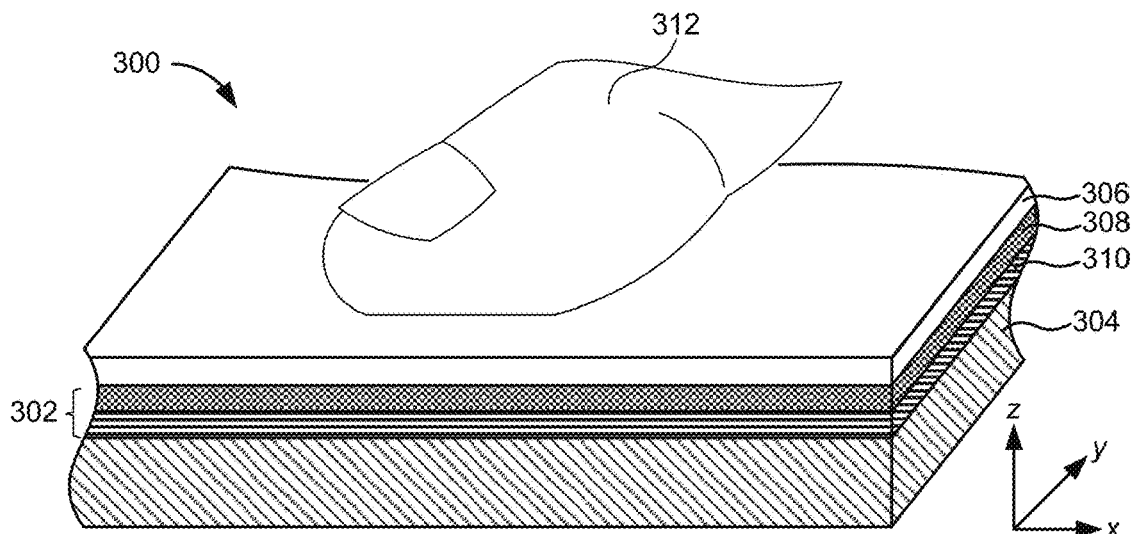
FIGS. 3A-3C show cross-sectional views of examples of an ultrasonic sensing system, according to some implementations.
Figure 3B:
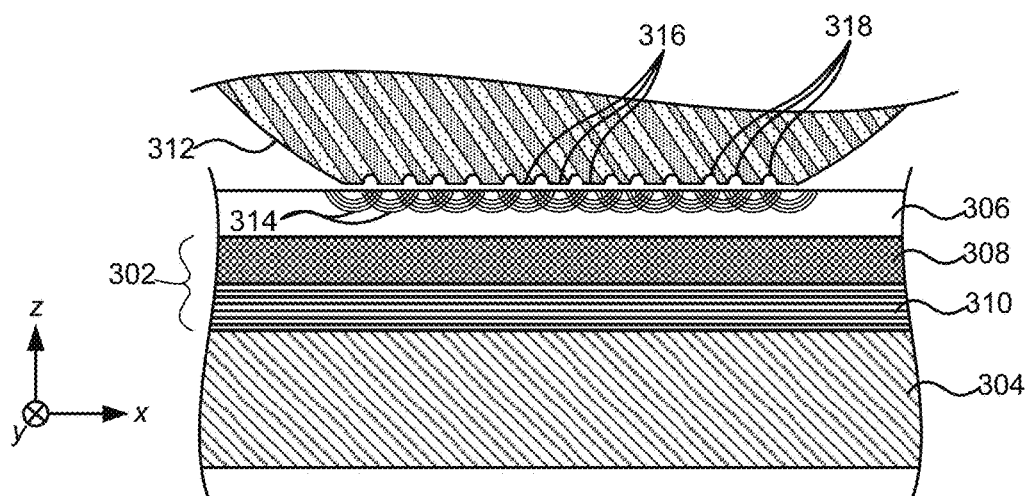

FIG. 3A shows a cross-sectional of an example of an ultrasonic sensing system according to some implementations. FIG. 3B shows an enlarged cross-sectional side view of the ultrasonic sensing system of FIG. 3A according to some implementations. In the illustrated example, the ultrasonic sensing system 300 may implement the ultrasonic sensing system 118 described with reference to FIG. 1 or the ultrasonic sensing system 200 shown and described with reference to FIGS. 2A and 2B. The ultrasonic sensing system 300 may include an ultrasonic transducer 302 that overlies a substrate 304 and that underlies a platen (a "cover plate" or "cover glass") 306. The ultrasonic transducer 302 may include both an ultrasonic transmitter 308 and an ultrasonic receiver 310.

The ultrasonic transmitter 308 may be configured to generate ultrasonic waves towards the platen 306, and a target object 312 positioned on the upper surface of the platen 306. In the illustrated implementation the object 312 is depicted as finger, but any appendage or body part may be contemplated by the present techniques, as well as any other natural or artificial object. In some implementations, the ultrasonic transmitter 308 may more specifically be configured to generate ultrasonic plane waves towards the platen 306. In some implementations, the ultrasonic transmitter 308 includes a layer of piezoelectric material such as, for example, polyvinylidene fluoride (PVDF) or a PVDF copolymer such as PVDF-TrFE. For example, the piezoelectric material of the ultrasonic transmitter 308 may be configured to convert electrical signals provided by the controller of the ultrasonic sensing system into a continuous or pulsed sequence of ultrasonic plane waves at a scanning frequency. In some implementations, the ultrasonic transmitter 308 may additionally or alternatively include capacitive ultrasonic devices.

The ultrasonic receiver 310 may be configured to detect ultrasonic reflections 314 resulting from interactions of the ultrasonic waves transmitted by the ultrasonic transmitter 308 with ridges 316 and valleys 318 defining surface texture of the target object 312 being scanned. In some implementations, the ultrasonic transmitter 308 overlies the ultrasonic receiver 310 as, for example, illustrated in FIGS. 3A and 3B. In some other implementations, the ultrasonic receiver 310 may overlie the ultrasonic transmitter 308. The ultrasonic receiver 310 may be configured to generate and output electrical output signals corresponding to the detected ultrasonic reflections. In some implementations, the ultrasonic receiver 310 may include a second piezoelectric layer different than the piezoelectric layer of the ultrasonic transmitter 308. For example, the piezoelectric material of the ultrasonic receiver 310 may be any suitable piezoelectric material such as, for example, a layer of PVDF or a PVDF copolymer. The piezoelectric layer of the ultrasonic receiver 310 may convert vibrations caused by the ultrasonic reflections into electrical output signals. In some implementations, the ultrasonic receiver 310 further includes a thin-film transistor (TFT) layer. In some such implementations, the TFT layer may include an array of sensor pixel circuits configured to amplify the electrical output signals generated by the piezoelectric layer of the ultrasonic receiver 310. The amplified electrical signals provided by the array of sensor pixel circuits may then be provided as raw measured image data to the processing unit for use in processing the image data, identifying a fingerprint associated with the image data, and in some applications, authenticating a user associated with the fingerprint. In some implementations, a single piezoelectric layer may serve as the ultrasonic transmitter 308 and the ultrasonic receiver 310. In some implementations, the substrate 304 may be a glass, plastic or silicon substrate upon which electronic circuitry may be fabricated. In some implementations, an array of sensor pixel circuits and associated interface circuitry of the ultrasonic receiver 310 may be configured from CMOS circuitry formed in or on the substrate 304. In some implementations, the substrate 304 may be positioned between the platen 306 and the ultrasonic transmitter 308 and/or the ultrasonic receiver 310. In some implementations, the substrate 304 may serve as the platen 306. One or more protective layers, acoustic matching layers, anti-smudge layers, adhesive layers, decorative layers, conductive layers or other coating layers (not shown) may be included on one or more sides of the substrate 304 and the platen 306.aaaaJ The platen 306 may be formed of any suitable material that may be acoustically coupled with the ultrasonic transmitter 308. For example, the platen 306 may be formed of one or more of glass, plastic, ceramic, sapphire, metal or metal alloy. In some implementations, the platen 306 may be a cover plate such as, for example, a cover glass or a lens glass of an underlying display. In some implementations, the platen 306 may include one or more polymers, such as one or more types of parylene, and may be substantially thinner.

In some implementations, the platen 306 may have a thickness in the range of about 10 microns (μm) to about 1000 μm or more.

Figure 3C:
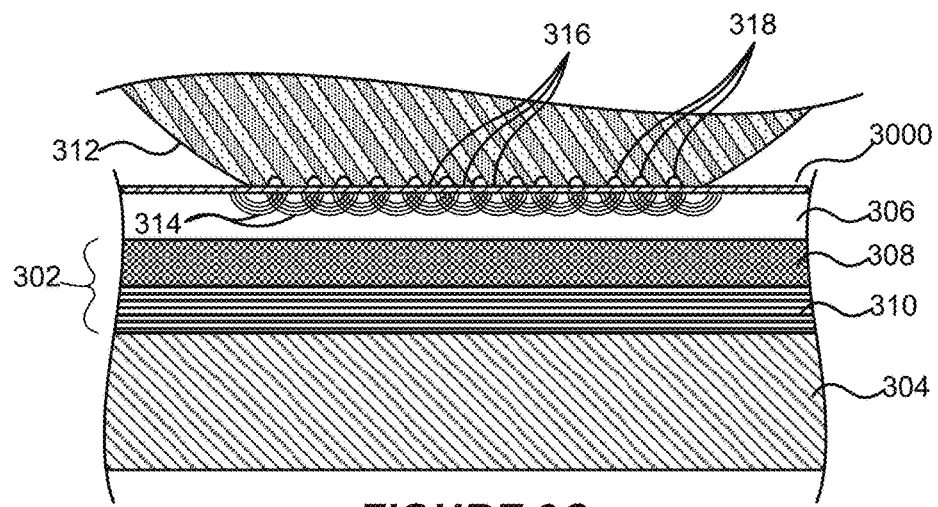

As illustrated in FIGS. 3A and 3B, the target object 312 is in direct contact with the platen 306. However, as indicated hereinabove, a screen protector may be disposed over the platen 306. FIG. 3C illustrates an implementation in which a screen protector 3000 is disposed above the platen 306. Such a screen protector may be installed (or removed) by a user or third party after factory calibration of the ultrasonic sensing system 300. Moreover, in the absence of the presently disclosed techniques, installation or removal of a screen protector may adversely affect imaging capability of the ultrasonic sensing system.

Figure 4:
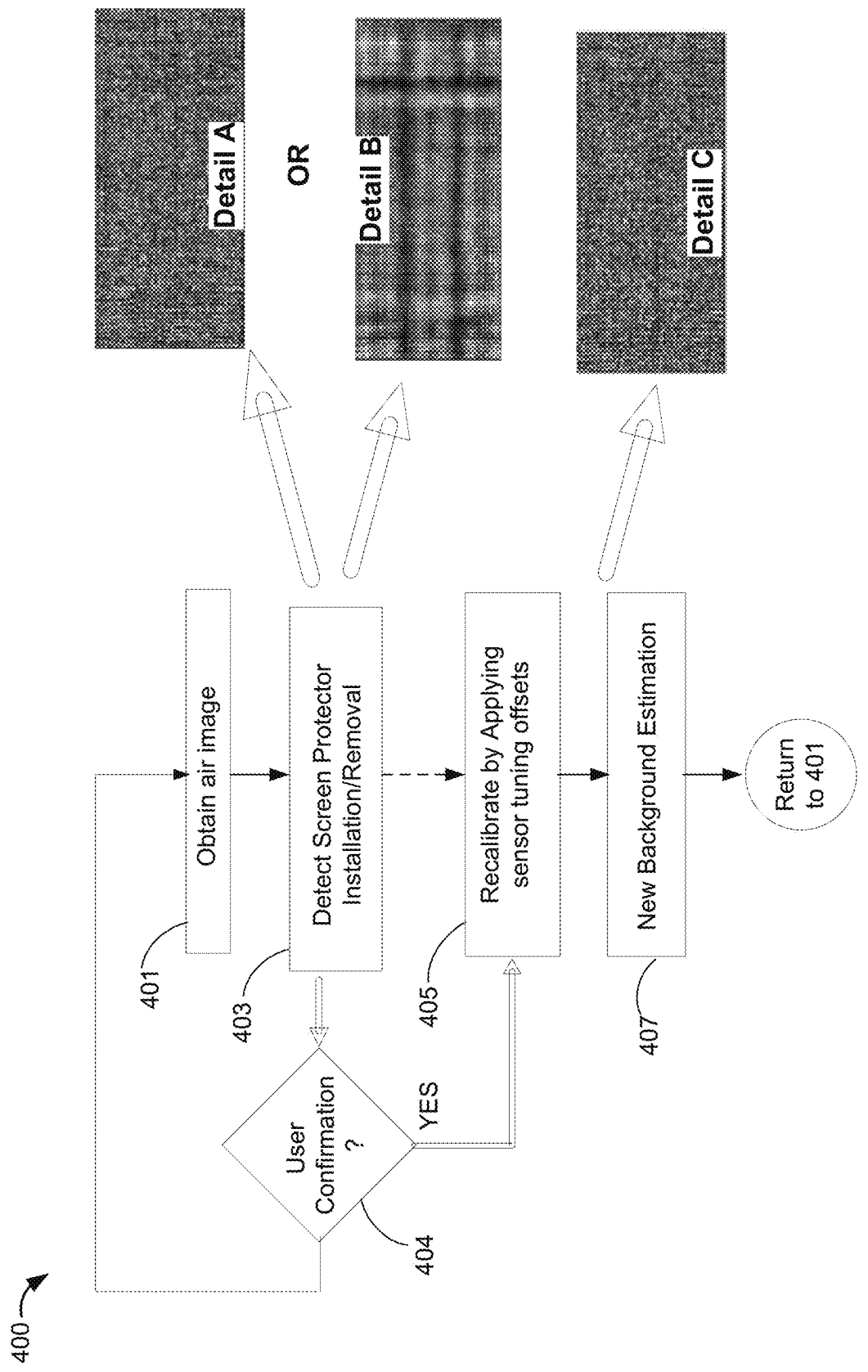
FIG. 4 illustrates a process flow diagram for detecting effects of the screen protector on image quality.

FIG. 4 illustrates a process flow diagram for detecting effects of the screen protector on image quality. In general, a well calibrated ultrasonic sensor, in the absence of a target object to be detected, can be expected to present a vacant "air" image that is largely amorphous, such as illustrated in Detail A. During a factory calibration process, a background estimation process may be performed so as to achieve such an amorphous air image, whether the ultrasonic sensor is provided with a screen protector. The present inventors have appreciated that subsequent installation or removal of a screen protector may result in a more structured, frame-like, air image is illustrated in Detail B. In an implementation, a method 400 includes obtaining, at block 401, an air image. At block 403 an analysis of the obtained air image may be performed in order to detect whether a screen protector has been installed or removed. Block 403 may include making a comparison between the air image obtained at Block 401 with a baseline air image obtained during or otherwise associated with a factory calibration process (e.g., Detail A).

When the analysis of the air image obtained at Block 401 with the baseline air image suggests that a screen protector has been installed or removed (e.g., because the obtained air image has structured frame-like elements such as illustrated in Detail B), the method may, at block 404, initiate a prompt requesting a user to confirm whether the user has installed or remove the screen protector. In the absence of user confirmation, the process may return to Block 401, which step may be repeated at some regular or irregular time interval. In some implementations the performance of method 400, starting at block 401 may occur at intervals of tens of seconds or minutes, for example.

If the user confirms that screen protector installation or removal as occurred, the process may proceed, at block 405, to recalibrate the ultrasonic sensor array, by applying, for example, sensor tuning offsets, such as frequency offset, time delay offset and phase correction offset, etc., and performing a new background estimation process (Block 407) so as to achieve the desired amorphous air image (Detail C). Following completion of the new background estimation at Block 407 the method may return to Block 401.

Optionally, the block 404 for checking for a user confirmation may be omitted, and the method may contemplate proceeding directly from block 403 to block 405. Thus, in this optional case, a new background estimation and recalibration of the ultrasonic sensor array may be performed without prompting the user to confirm that screen protector installation or removal as occurred. For example, in such implementations, the control system 204 may be configured to perform the analysis of the obtained air image at block 403 and determine whether a screen protector has been installed or removed. In some implementations, the control system 204 may make such determination after a machine learning process for example.

Figure 5:
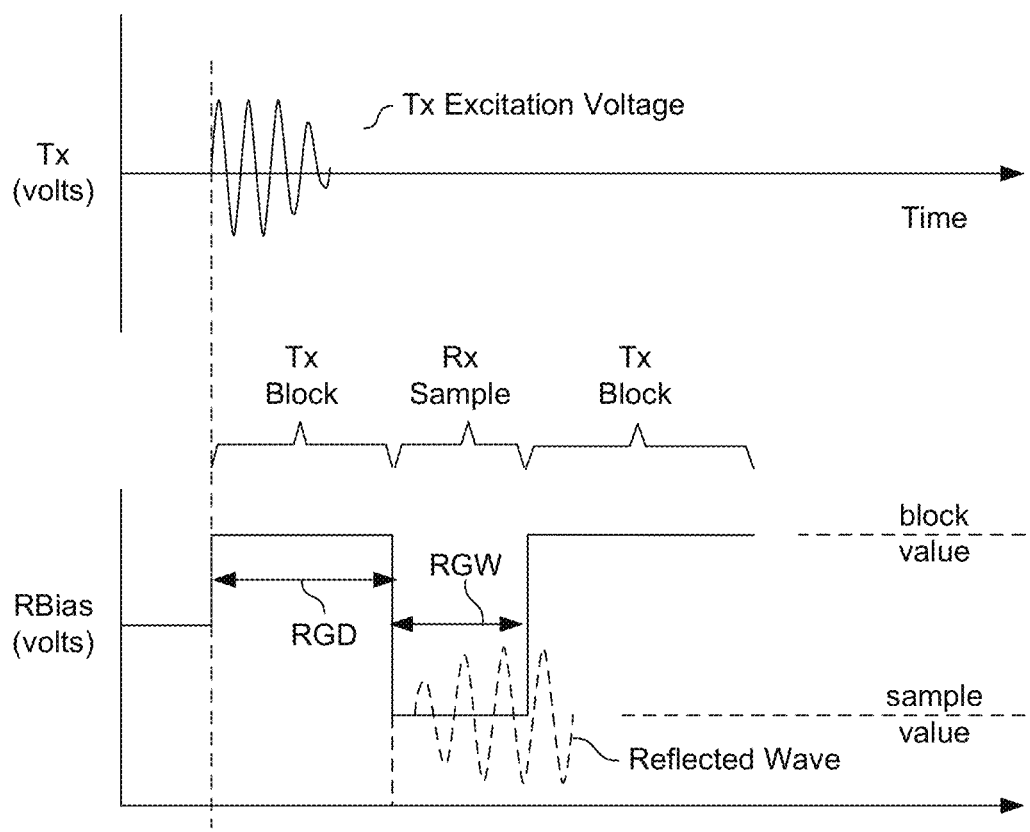
FIG. 5 illustrates an example of range gate delay.

In some implementations, adverse effects of installation or removal of a screen protector may be mitigated by adjusting the "range gate delay" of the ultrasonic sensor. FIG. 5 illustrates an example of range gate delay as the term is used herein. More particularly, FIG. 5 graphically illustrates an example of transmitter excitation signals and receiver bias voltage levels as a function of time. The transmitter excitation signals (upper graph) may be provided to an ultrasonic transmitter, whereas the receiver bias voltage (lower graph) may be applied to an RBias electrode of an ultrasonic sensor element. One or more cycles of an ultrasonic transmitter excitation signal may be applied to the ultrasonic transmitter, as shown in the upper graph of FIG. 5. In some implementations, a single transmitter excitation cycle may be used. In some implementations, as illustrated, multiple excitation cycles may be used, such as two cycles, three cycles, four cycles, five cycles or more. The transmitter excitation signals in some implementations may be square waves, rectangular waves, partial waves, pulsed waves, multiple-frequency waves, chirped waves, low or high duty-cycle waves, variable-amplitude waves, variable-frequency waves, or other suitable waveform for driving an ultrasonic transmitter. During a first portion of time ("Tx Block") when transmission of the outgoing ultrasonic wave is occurring, the bias voltage applied to the RBias electrode may correspond to a "block value" such that the receiver bias electrode prevents signals reflected from outgoing transmitted waves from being captured by a sensor pixel circuit.

During a subsequent portion of time ("Rx Sample"), the bias level of the control signal applied to the RBias electrode is set to a "sample value" and the reflected ultrasonic signals may be captured a sensor pixel. The Rx Sample period may start upon completion of the range gate delay ("RGD") period. The RGD period may typically be in a range of 0.5-2 microseconds. The duration of the Rx sample period may be referred to as the range gate window ("RGW") period. The RGW period may typically be less than one microsecond. In some implementations, the RGW period may be in the range of about 200 to 1000 nanoseconds. To prevent detection of unwanted internal reflections, the bias level applied to the receiver bias electrode may be brought back to the block value upon completion of the RGW period. The RGW period, in the illustrated implementation, may correspond to a time interval that is roughly similar to the period of a transmitter excitation cycle ("tone burst"). In other implementations, the RGW period may be shorter or longer than the period of the tone burst. During RGW period, the sensor pixel may be said to be in a "read mode" of operation. During or near the RGW period, the receiver may output signals, resulting from or corresponding to localized electrical charges generated by the piezoelectric receiver layer and collected by the pixel input electrodes.

Figure 6:
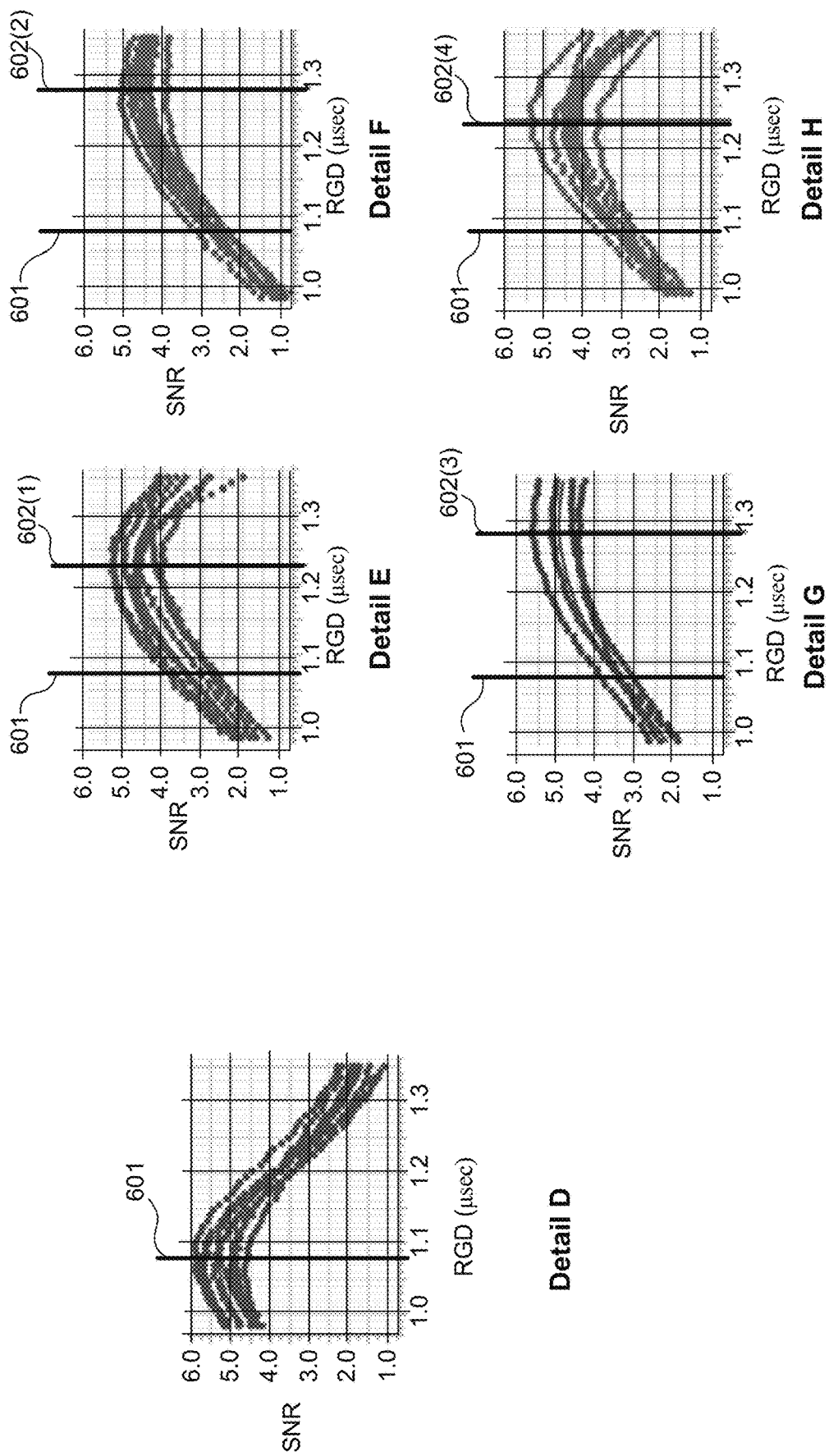
FIG. 6 illustrates plots of signal-to-noise ratio as a function of range gate delay (RGD), according to some implementations.

The present inventors have found that adverse effects on image quality (IQ), caused by reduced signal-to-noise ratio (SNR) resulting from a screen protector may be substantially mitigated by adjusting the RGD, taking into account thickness and material properties of the screen protector. FIG. 6 illustrates plots of SNR as a function of RGD. Referring first to Detail D, example plots of SNR as a function of RGD are illustrated for an example ultrasonic sensor with no screen protector. It may be observed that a peak SNR (of about 4.5-6) is obtained at an RGD 601 of about 1.075 psec. Referring next to Details E-H, four example plots of SNR as a function of RGD are illustrated for an example ultrasonic sensor including a screen protector. Each of the four examples is for a respective screen protector having respective characteristics, including material properties and thickness, for example. It may be observed that a peak SNR (of about 3.5-5.5) occurs at RGD values in the range of 1.23 to 1.28 psec.

It will be appreciated that, by appropriately adjusting the RGD, an adverse effect of the screen protector on SNR may be significantly reduced. SNR vs RGD data illustrated in Detail E for a first screen protector type indicate a peak SNR in the range of 4 to 5.5 at an adjusted RGD 602(1) of 1.23 psec. In the absence of the adjustment to RGD, the SNR at RGD 601 would be in the range of 2.5-4. SNR vs RGD data illustrated in Detail F for a second screen protector type indicate a peak SNR in the range of 3.9 to 5.2 at an adjusted RGD 602(2) of 1.28 psec. In the absence of the adjustment to RGD, the SNR at RGD 601 would be in the range of 2.4-3.3. SNR vs RGD data illustrated in Detail G for a third screen protector type indicate a peak SNR in the range of 4.5 to 5.6 at an adjusted RGD 602(3) of 1.28 psec. In the absence of the adjustment to RGD, the SNR at RGD 601 would be in the range of 3.1-4.0. SNR vs RGD data illustrated in Detail H for a fourth screen protector type indicate a peak SNR in the range of 3.6 to 5.4 at an adjusted RGD 602(4) of 1.23 psec. In the absence of the adjustment to RGD, the SNR at RGD 601 would be in the range of 2.8-3.8.

Figure 7:
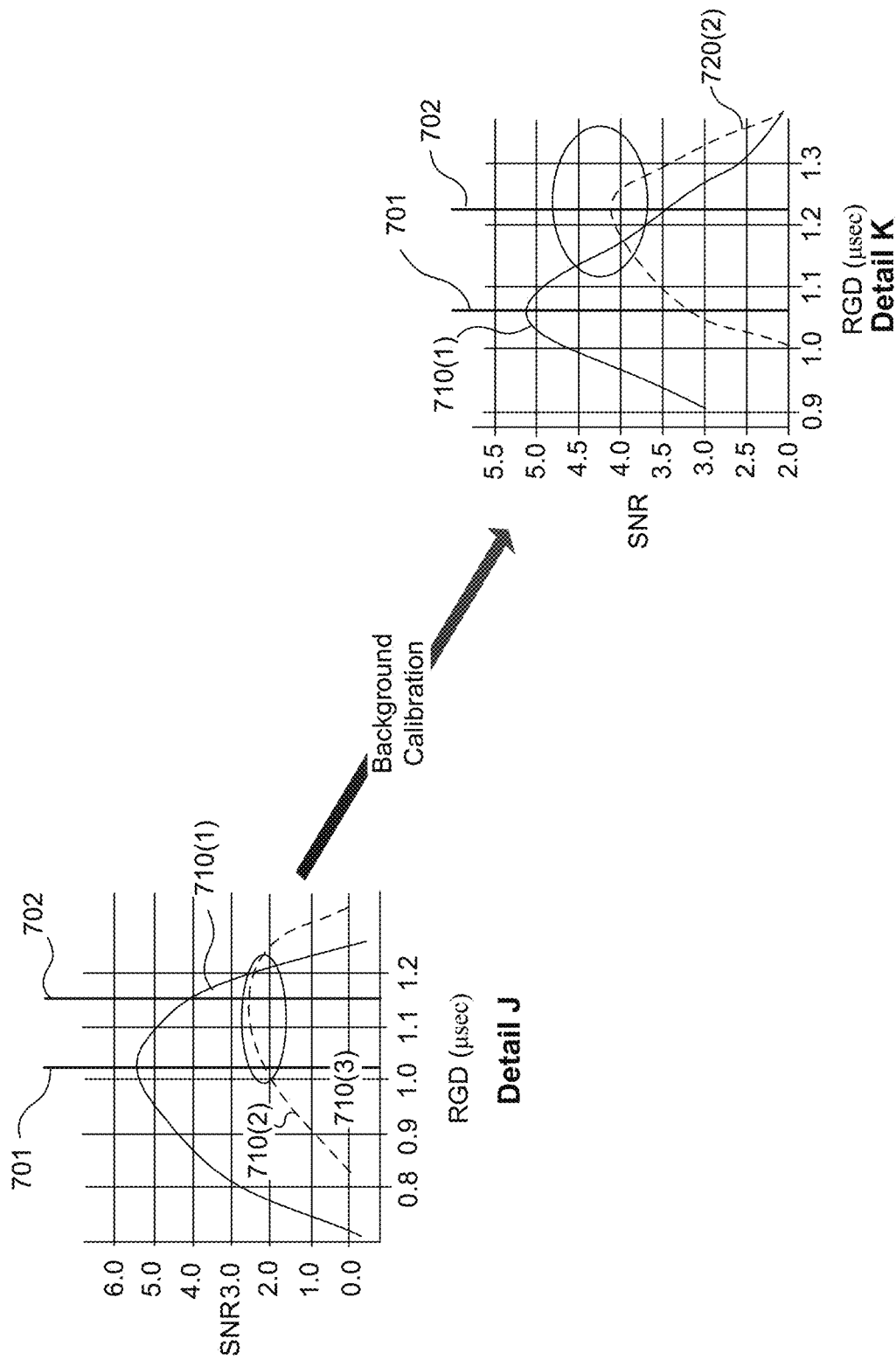
FIG. 7 illustrates an example of adjusting the RGD and performing a background calibration, according to some implementations.

In some implementations, adjusting the RGD may be combined with performing a background calibration. FIG. 7 illustrates an example of adjusting the RGD and performing a background calibration. In Detail J, a plot of SNR vs RGD is presented for an example ultrasonic sensor with no screen protector, plot 710(1), and with a screen protector, plot 710(2). By adjusting the RGD from about 1.02 μsec (RGD 701) to about 1.15 μsec (RGD 702), SNR may be observed to have increased from about 2 to 2.5. By additionally performing a background calibration, plot 720(2) (Detail K) shows that peak SNR is further improved to about 4.2.

Figure 8:
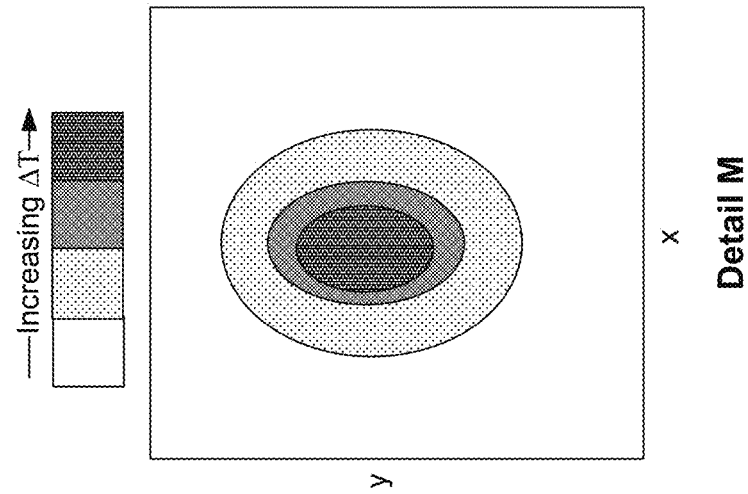
FIG. 8 illustrates example plots of thermal gradients for a glass platen without a screen protector and with a plastic screen protector.
Figure 8:
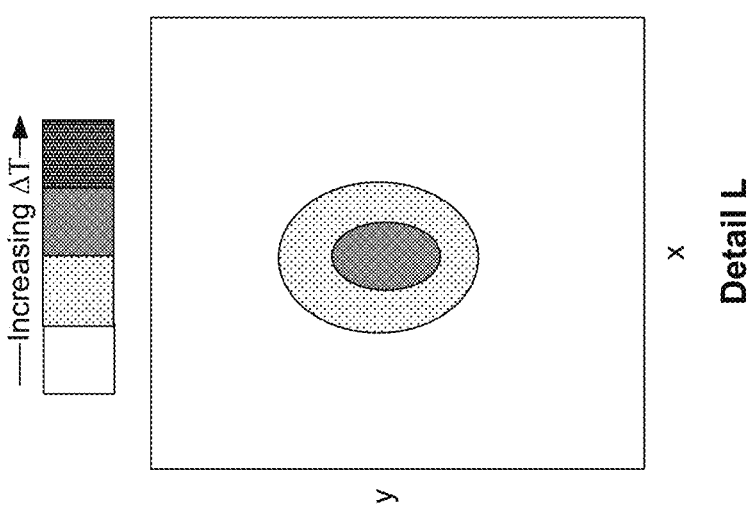

Alternatively or in addition to the above disclosed techniques, installation or removal of a screen protector may be detected using one or more the following indicators: phase of received ultrasonic waves, platen temperature gradients, change of SNR vs RGD characteristics and/or as a function of background calibration, and change in touchscreen capacitance. More particularly, in some implementations, a change in phase characteristics of received ultrasonic wave reflected from a target object may be detected by the ultrasonic sensor and correlated with a change in effective thickness of material of the platen plus screen protector (if present) through which the ultrasonic wave is received. In some implementations, installation or removal of a screen protector may be indicated by a change in thermal characteristics of the platen plus screen protector (if present), particularly thermal conductivity, which may result in detectable changes in temperature gradient patterns. The inventors have found that changes in temperature gradient patterns may be particularly pronounced when the screen protector is plastic due to the much higher thermal conductivity of glass than of plastic. FIG. 8 illustrates example plots of thermal gradients for a glass platen without a screen protector and with a plastic screen protector. Comparing Detail L (glass platen) with Detail M (plastic screen protector), it may be observed that, when a source of heat (or cold) is applied the glass platen exhibits a smaller max ΔT and a generally smaller effected area than the plastic screen protector.

In some implementations, a changed characteristic of IQ vs RGD may be correlated with installation or removal of a screen protector. As described above in connection with FIGS. 6 and 7, installation or removal of a screen protector can result in detectable changes in characteristics of SNR (which can be correlated with IQ) as a function of RGD. For example, it was observed generally, when a screen protector is installed, an RGD may be preferred that is longer than the RGD that is best in the absence of a screen protector. This phenomenon may be used to determine whether a screen protector has been installed or removed. For example, SNR or IQ may be determined for a number of RGD values, and the resulting characteristics signature may compared to one or more baseline signatures. Similarly, because it has been found that recalibration based on background estimation has a more pronounced effect on IQ when a screen protector is installed than when no screen protector is installed, such recalibration can also be used to determine whether a screen protector has been installed or removed. Finally, the installation or removal of a screen protector may be indicated by a detected change in capacitance and/or capacitive behavior of a touchscreen device associated with the ultrasonic sensor.

In some implementations, the effect of installation or removal of a screen protector on performance of an ultrasonic sensor array is further mitigated by innovative sensor drive schemes, image processing. For example, in some implementations, a sensor drive scheme may be advantageously configured to provide a more extensive RGD range within which acceptably high SNR values can be expected. This may be accomplished, for example, by increasing a duration of a transmit tone burst and/or use of quasi-continuous wave transmit signals instead of pulse signals. As a result, near-optimal sensor performance may be obtained whether a screen protector is present. In some implementations, image processing techniques may increase a range of optimal operation settings. For example, point spread function (PSF) image reconstruction techniques may be contemplated. Alternatively or in addition, receiver beamforming may be implemented.

Figure 9:
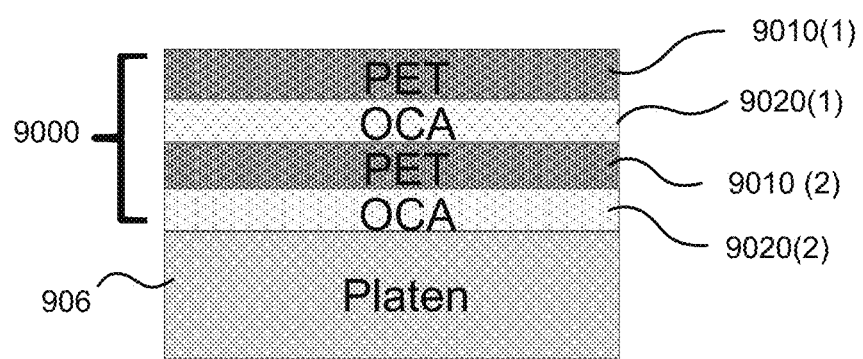
FIG. 9 illustrates an example of a screen protector stack disposed over a platen, according to some implementations.

In some implementations, the effect of installation or removal of a screen protector may be minimized by judicious selection of screen protector design guidelines. FIG. 9 illustrates an example of a screen protector stack disposed over a platen. In the illustrated example, a platen 906 is overlaid with a screen protector stack 9000. The screen protector stack 9000 includes a first and second transparent plastic layer 9010(1) and 9010(2). In the illustrated example, the transparent plastic layers may be composed of polyethylene terephthalate (PET) and adhered together by an optically clear adhesive (OCA) layer 9020(1). A second OCA layer 9020(2) may adhere the second PET layer 9010(2) to the platen 906. The inventors have found that the effect of installation or removal of the screen protector stack 9000 may be reduced by configuring the stack 9000 to have an overall stack thickness chosen with regard to a characteristic wavelength, λ, of the ultrasonic transmission. For example, the stack thickness may be, advantageously, selected to be approximately of about 0.75λ or 1.25λ. Advantageously, the OCA layers may be configured as a high modulus adhesive having good acoustic transmission properties.

Figure 10:
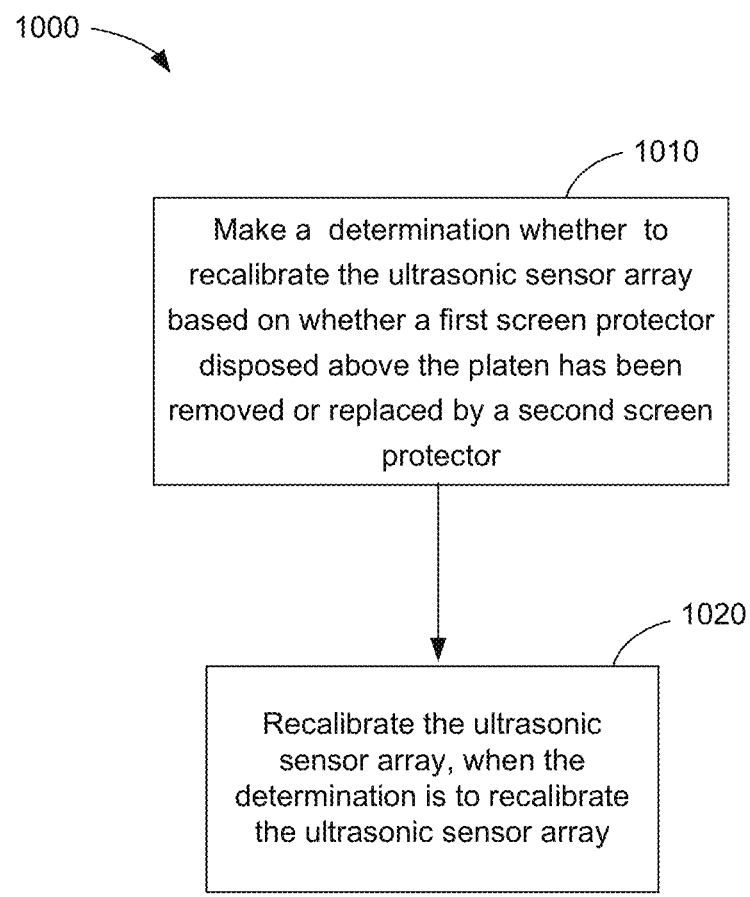
FIG. 10 illustrates an example of a process flow of a method for operating an ultrasonic sensor array, according to some implementations.

FIG. 10 illustrates an example of a process flow of a method for operating an ultrasonic sensor array. As described hereinabove, the ultrasonic array may be disposed under a platen. Above the platen, a removable screen protector may or may not be present. The method 1000 may start, at block 1010, with making a determination whether to recalibrate the ultrasonic sensor array based on whether the screen protector has undergone a change. A change may be related to installing the screen protector, removing the screen protector, or replacing a first screen protector with a second screen protector. At block 1020, the method may continue with calibrating the ultrasonic sensor array, when the determination, at block 1010, is to recalibrate the ultrasonic sensor array.

Thus, techniques for detecting installation or removal or replacement of a screen protector disposed over an ultrasonic sensor array, and calibrating the ultrasonic sensor array for such change, have been disclosed. It will be appreciated that a number of alternative configurations and operating techniques may be contemplated.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor or any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by or to control the operation of data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

What is claimed is:

1. A method for operating an ultrasonic sensor array, the ultrasonic sensor array disposed under a platen, the method comprising:
   determining whether one or more characteristics indicate that a first screen protector disposed above the platen has been removed or replaced by a second screen protector, the one or more characteristics including one or more of: a phase of received ultrasonic waves, a platen temperature gradient, a change of signal-to-noise ratio (SNR) or image quality (IQ) versus one or more range gate delay characteristics, a change of SNR or IQ characteristics as a function of background calibration, or change in touchscreen capacitance; and
   recalibrating the ultrasonic sensor array, when the determination is that the one or more characteristics indicate that the first screen protector disposed above the platen has been removed or replaced by the second screen protector.

2. The method of claim 1, wherein the method involves performing a background estimation process and wherein the determination is based, at least in part, on one or more results of the background estimation process.

3. The method of claim 2, wherein the background estimation process includes obtaining characteristics of an air image and comparing the obtained characteristics with characteristics of a baseline air image.

4. The method of claim 3, wherein the baseline air image comprises an air image obtained by the ultrasonic sensor array operating without any screen protector.

5. The method of claim 1, further comprising prompting a user to indicate whether the screen protector has been removed or replaced, and wherein the recalibrating is performed only after confirmation from the user.

6. The method of claim 1, further comprising mitigating effects of removal or replacement of the first screen protector by adjusting at least one sensor tuning offset.

7. The method of claim 6, wherein the at least one sensor tuning offset includes one or more of range gate delay, frequency offset, time delay offset or phase correction offset.

8. An apparatus comprising:
   an ultrasonic sensor array;
   a platen; and
   a controller, wherein the controller is configured to:
      determine whether one or more characteristics of received ultrasonic waves indicate that a first screen protector disposed above the platen has been removed or replaced by a second screen protector; and
      recalibrate the ultrasonic sensor array responsive to determining that the one or more characteristics of the received ultrasonic waves indicate that the first screen protector disposed above the platen has been removed or replaced by the second screen protector.

9. The apparatus of claim 8, wherein the platen is a cover plate or a cover glass.

10. The apparatus of claim 8, wherein the controller is configured to perform a background estimation process and wherein the determining is based, at least in part, on one or more results of the background estimation process.

11. The apparatus of claim 10, wherein the background estimation process involves obtaining characteristics of an air image and comparing the obtained characteristics with characteristics of a baseline air image.

12. The apparatus of claim 11, wherein the baseline air image corresponds to an air image obtained by the ultrasonic sensor array when operated without any screen protector.

13. The apparatus of claim 8, wherein the controller is further configured to prompt a user to indicate whether the first screen protector has been removed or replaced, and wherein the controller is configured to recalibrate the ultrasonic sensor array only after receiving confirmation from the user that the first screen protector has been removed or replaced.

14. The apparatus of claim 8, wherein the controller is further configured to mitigate effects of removal or replacement of the first screen protector by adjusting at least one sensor tuning offset.

15. The apparatus of claim 14, wherein the at least one sensor tuning offset includes one or more of range gate delay, frequency offset, time delay offset and phase correction offset.

16. A non-transitory computer readable medium storing program code to be executed by a controller of an apparatus that includes an ultrasonic sensor array disposed under a platen, the program code comprising instructions configured to cause the controller to:
   determine whether one or more characteristics indicate that a first screen protector disposed above the platen has been removed or replaced by a second screen protector, the one or more characteristics including one or more of: a platen temperature gradient or a change in touchscreen capacitance; and
   recalibrate the ultrasonic sensor array responsive to determining that the one or more characteristics indicate that the first screen protector disposed above the platen has been removed or replaced by the second screen protector.

17. The computer readable medium of claim 16, wherein the instructions are configured to cause the controller to perform a background estimation process and wherein the one or more characteristics include one or more results of the background estimation process.

18. The computer readable medium of claim 17, wherein the background estimation process includes obtaining characteristics of an air image and comparing the obtained characteristics with characteristics of a baseline air image.

19. The computer readable medium of claim 18, wherein the baseline air image corresponds to an air image obtained by the ultrasonic sensor array operating without any screen protector.

20. The computer readable medium of claim 16, the program code further comprising instructions configured to cause the controller to prompt a user to indicate whether the first screen protector has been removed or replaced, and to cause the controller to recalibrate the ultrasonic sensor array only after receiving confirmation from the user that the first screen protector has been removed or replaced.

* * * * *